S. R. NYE.
HORSE HAY RAKE.
No. 105,833.  Patented July 26, 1870.
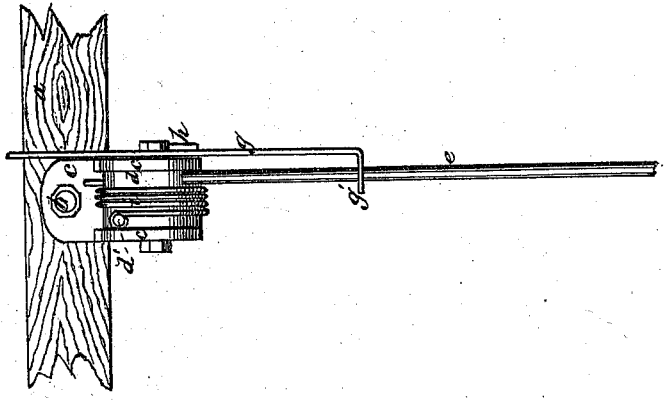
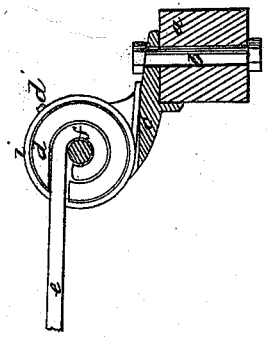
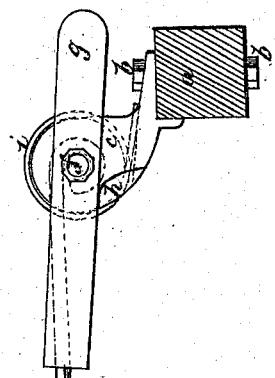

United States Patent Office.

SHERMAN R. NYE, OF BARRE, MASSACHUSETTS.

Letters Patent No. 105,833, dated July 26, 1870.

IMPROVEMENT IN HORSE HAY-RAKES.

The Schedule referred to in these Letters Patent and making part of the same

To all whom it may concern:

Be it known that I, SHERMAN R. NYE, of Barre, in the county of Worcester and State of Massachusetts, have invented a new and useful Improvement in Horse Rakes; and I do hereby declare the following to be a full, clear, and exact description of the same, sufficient to enable others skilled in the art to which the invention appertains to fully understand and use the same, reference being had to the accompanying drawing making a part of this specification.

My invention has reference to the means for connecting the rod or wire tooth to the rake-head, with a view to afford the teeth ample vibratory movement upon their pivoted attachments, to enable them to yield to and pass over unusual obstructions, and restore them to their operative positions when such obstructions have been passed.

The invention also has reference to the provision of a brace, which acts in conjunction with a rest or stop, and a movable rake-head, for the purpose of controlling the friction of the rake-teeth, as hereinafter explained.

Figure 1 represents a side elevation of a rake-tooth and its appurtenances as attached to a rake-head.

Figure 2 is a plan of the parts shown in fig. 1.

Figure 3 is a vertical section of the tooth-holder at right angles with the pivoted attaching-bolt.

Similar letters of reference indicate corresponding parts in the several figures.

It will, of course, be understood, that the usual number or series of rake-teeth is attached to the rake-head $a$ in the same manner as the single tooth $e$, which is sufficient, alone, to illustrate the invention.

$c$ is a casting, termed a holder, and $f$, a bolt, through the medium of which the tooth $e$ is attached to the rake-head.

$g$ is a lever or brace, secured upon one end of the bolt $f$, and adapted to turn therewith, the bolt serving as a fulcrum for said lever.

The rear end of the brace $g$ is bent at a right angle, and the deflected part has an eye, $g'$, through which the tooth passes.

$h$ is a stop or projection upon the holder $c$, which stop limits the downward movement of the rear end of the brace $g$, and thereby prevents the undue depression of the rake-tooth by the downward impelling force of the spring $i$.

The spring $i$ encircles a drum, $d$, which is mounted concentrically upon the bolt $f$.

An aperture extends from the circumference to the bore of the drum $d$, and the rake-tooth passes through said aperture to the bolt $f$, with which the hooked end of the tooth engages, as clearly shown in fig. 3.

One end of the spring $i$ is confined between the drum $d$ and the base-plate of the holder $c$, while the other end of said spring is made fast to a pin, $d'$, projecting from the drum $d$.

The holder $c$ consists simply of two jaws or ears, cast at opposite sides of a base-plate.

The stop $h$ is formed upon the outer face of one of the jaws, and between the jaws are situated the drum $d$, the spring $i$, and the end of the rake-tooth, as before explained, they being held there by means of the bolt $f$, which passes through said jaws.

The base of the holder $c$ is offset upon the rake-head $a$, and secured firmly therein by the bolt $b$.

The head $a$ is movable, and it is designed to provide the rake with a lever, whereby said head may be elevated and made to rest against the heel or forward end of the brace $g$, for the purpose of holding the teeth firmly in contact with the ground, when desired. In other words, the rake-head $a$, when elevated, forms a rest for the front ends of the braces $g$, and hence all the teeth may be prevented from turning with or upon their attaching bolts, when it is desired to give the teeth a more rigid or unyielding character, to suit the nature of the ground, or the requirements of the work to be performed.

The rake-head in its normal position serves to properly limit the motion of the tooth $a$, when it turns with the bolt or upon its center, in overriding obstacles, because the brace $g$, when brought into contact with the rake-head, naturally arrests the upward movement of the rake-tooth upon its center.

It will be seen from the above that my improved brace not only affords vertical and lateral support to the tooth, but is concerned in maintaining its operative position and regulating its movements.

When the holder $c$ is detached from the rake-head $a$, it may, together with the other appurtenances of the tooth, remain undetached from the rake-tooth, and, while the parts are thus intact, they are necessarily convenient for transportation.

Having thus described my invention,

What I claim as new herein, and desire to secure by Letters Patent, is—

1. The arrangement of the drum $d$, spring $i$, holder $c$, and tooth $e$, as herein described, and for the purpose set forth.

2. The brace or lever $g$, applied to operate in connection with the rake-head, the tooth, and tooth-holder, in the manner and for the purpose explained.

3. The stop $h$ and brace $g$, when employed in connection with the tooth $e$, the holder $c$, and the rake-head $a$, substantially as and for the purpose set forth.

SHERMAN R. NYE.

Witnesses:
J. H. ADAMS,
T. C. SMITH.